May 28, 1929.　　F. H. LE JEUNE ET AL　　1,714,512

DISK WHEEL

Filed Feb. 16, 1927

INVENTORS.
FRANK H. Le JEUNE & EMIL R. JACOBI
BY
ATTORNEY.

Patented May 28, 1929.

1,714,512

UNITED STATES PATENT OFFICE.

FRANK H. LE JEUNE AND EMIL R. JACOBI, OF JACKSON, MICHIGAN, ASSIGNORS, BY MESNE ASSIGNMENTS, TO KELSEY-HAYES WHEEL CORPORATION, OF DETROIT, MICHIGAN, A CORPORATION OF NEW YORK.

DISK WHEEL.

Application filed February 16, 1927. Serial No. 168,496.

This invention relates to disk wheels of the type employed on automotive vehicles.

The invention is concerned particularly with a disk wheel which is removable in its entirety to effect the comparatively frequent tire changes required with the use of pneumatic tires. Disk wheels thus removable are old, and likewise, disk wheels which are permanently affixed and wherein only the rim is removable, are old. There are certain advantages to disk wheels which are removable, but owing to their rigid rims, difficulty has been experienced in the removal of tires therefrom, especially tires which are comparatively large.

Accordingly, the present invention is directed to a removable disk wheel which is provided with a removable tire-carrying rim. The wheel and the rim are constructed so that the rim can be held upon the wheel by lug bolts, or other means, in such a way that the bolts and nuts are not readily observable, so that the appearance of the disk wheel is not marred by projecting bolts and nuts, as is the case with the ordinary demountable rims.

The invention further contemplates a novel arrangement wherein the felloe or fixed rim of the disk wheel, and a split tire-carrying rim have interengaging devices which form a driving connection between the disk and the rim, and which also form a tie for the ends of the split rim. The invention will be better understood by reference to the accompanying drawings wherein.

Figure 1:
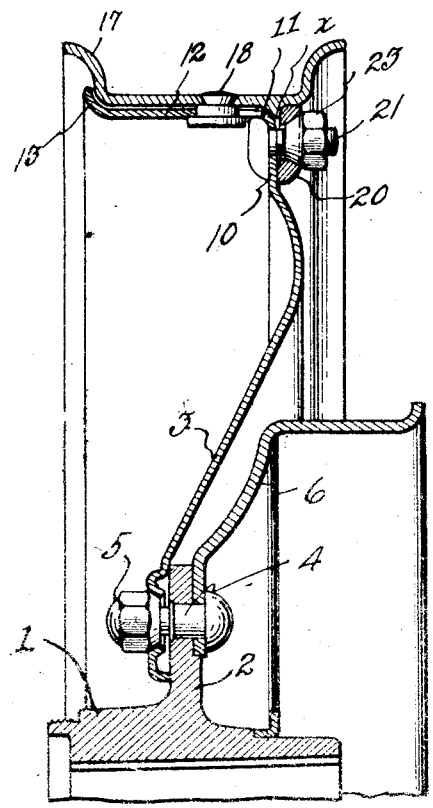
Fig. 1 is a sectional view taken through a disk wheel and rim constructed in accordance with the invention.

In the accompanying drawings the hub of a wheel is shown at 1 and this hub is provided with a flange 2. A disk 3 is detachably secured to the flange by means of bolts 4 and nuts 5. The bolts 4 are permanently fixed to the flange, and these bolts may also be utilized for the attachment of a brake drum 6.

As the disk extends outwardly from its central portion, it is directed inwardly of a vertical plane taken through the central portion of the disk, where it is attached to the hub. Near the peripheral edge of the disk, it is preferably provided with a part 10 which lies substantially in a vertical plane, and then the disk is turned outwardly as at 11 to form a felloe or fixed rim 12, and the extreme edge of the fixed rim is flanged as at 13.

Figure 3:
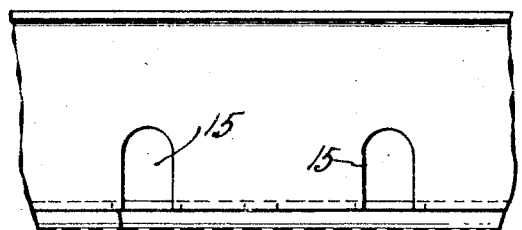
Fig. 3 is a plan view of a portion of the felloe showing the slots in the felloe.
Figure 2:
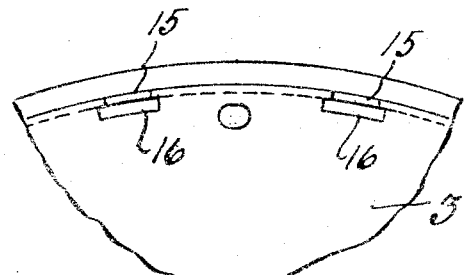
Fig. 2 is a side elevation of a portion of the disk showing slots in the disk which cooperate with means on the rim.
Figure 4:
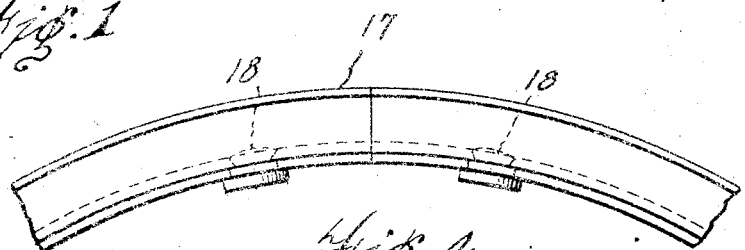
Fig. 4 is a side elevation of the abutting edges of the split rim showing the lugs for engagement with the disk.
Figure 5:
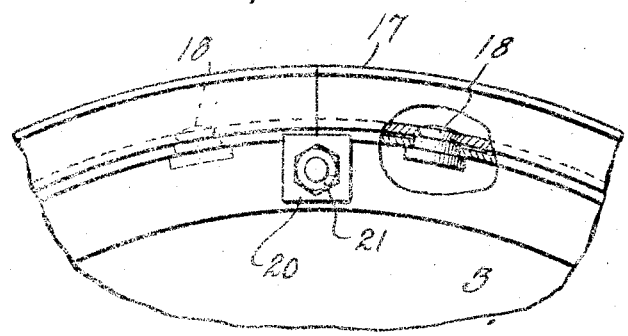
Fig. 5 is a view similar to Fig. 4 with the rim mounted on the disk, and being cut away to show the engagement of the rim lugs with the disk.

As shown in Figs. 2 and 3, the felloe is provided with slots 15, and these slots extend slightly into the portion 10 of the disk where they are somewhat enlarged, as shown at 16. A split rim 17 for carrying a tire, is demountably carried by the disk, and each end of the split rim is provided with a headed stud 18. When the rim is placed upon the disk the studs are passed through the enlarged portions 16 of the slots 15, and when the rim is pushed into place the heads of the studs underlie the felloe, as shown in Fig. 5. This arrangement effects a driving connection between the fixed rim, or felloe, of the disk, and the demountable rim, and at the same time forms a tie for the ends of the rim.

As will be noted by inspection of Fig. 1, the demountable rim is placed upon or removed from the inner side of the disk. The rim is held in place by lugs 20, a number of which are used at spaced points, and these lugs are carried by bolts 21. It will be noted that the nut 23 of the bolt is on the inside and concealed from view. The bead $x$ has a grooved back that rests on the bend 11 at the periphery of the disc. The stud and slot connection between the demountable rim and the felloe of the disk, prevents separation of the ends of the rim upon the tightening of the lug bolts.

It will be seen that the invention provides a split rim, the ends of which are tied together by the fixed rim, thus eliminating the use of tie plates on the demountable rim. When in use the entire wheel assembly can be changed by removal of the nuts 5, and a new wheel assembly mounted to effect the tire change. Should it be necessary to remove the tire in order to repair the same, the demountable rim can be readily taken off of the disk, and the tire removed from the demountable rim by compressing the same at its split ends.

It will be noted that the rim-holding lugs and the nuts on the lug bolts are on the inside of the disk, and are not visible when the wheel is in use. The heads of the lug bolts, of course, are on the outside of the disk, but these heads can be nicely shaped so as to not materially interrupt the continuity of the disk wheel. Moreover, the lug bolts do not project outwardly from the wheel, as is the present practice with demountable rims. The visible bolt head is inset practically the entire width of the rim and tire, so as to be practically unnoticeable.

We claim:

In a vehicle wheel, the combination of a disk wheel having a fixed rim, a split demountable rim carried by the fixed rim, a headed stud affixed to each end of the fixed rim, said fixed rim having slots for receiving said studs, said slots being extended into the side of the disc and being there enlarged to permit entrance of the heads of the studs, whereby said heads underlie the fixed rim when the demountable rim is in place.

In testimony whereof we have affixed our signatures.

FRANK H. LE JEUNE.
EMIL R. JACOBI.